US010581963B2

(12) United States Patent
Kim et al.

(10) Patent No.: US 10,581,963 B2
(45) Date of Patent: Mar. 3, 2020

(54) METHOD OF MANAGING RESOURCE AND PEER-TO-PEER SYSTEM INCLUDING NETWORK MANAGEMENT SERVER

(71) Applicant: Electronics and Telecommunications Research Institute, Daejeon (KR)

(72) Inventors: Sung Hei Kim, Daejeon (KR); Wook Hyun, Daejeon (KR); Chang Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 448 days.

(21) Appl. No.: 15/347,911

(22) Filed: Nov. 10, 2016

(65) Prior Publication Data

US 2017/0134485 A1    May 11, 2017

(30) Foreign Application Priority Data

Nov. 11, 2015 (KR) .................. 10-2015-0158021

(51) Int. Cl.
*H04L 29/08* (2006.01)

(52) U.S. Cl.
CPC ...... *H04L 67/1076* (2013.01); *H04L 67/1046* (2013.01)

(58) Field of Classification Search
CPC ....... H04L 67/104; H04L 67/02; H04L 67/10; H04L 67/34; H04L 12/18; H04L 51/14; H04L 67/1074; H04L 51/046; H04L 51/066; H04L 51/16; H04L 51/28; H04L 51/32; H04L 63/0227; H04L 63/061; H04L 67/22; H04L 67/26; H04L 67/306; H04L 63/145; H04L 67/1085; H04L 12/1854; H04L 41/042; H04L 41/0668; H04L 41/0893; H04L 45/00; H04L 45/34; H04L 45/50; H04L 45/502; H04L 65/4084; H04L 65/80; H04L 67/108; H04L 67/1082; H04L 67/327; H04L 41/0823; H04L 41/5009; H04L 47/10; H04L 47/14; H04L 47/193; H04L 47/263; H04L 63/104;

(Continued)

(56) References Cited

U.S. PATENT DOCUMENTS

| 9,712,427 | B1 * | 7/2017 | Pittman | ............... H04L 67/1097 |
| 2008/0155100 | A1 * | 6/2008 | Ahmed | ................ G06F 9/5011 |
| | | | | 709/226 |
| 2009/0287821 | A1 | 11/2009 | Luzzatti et al. | |
| 2011/0019692 | A1 | 1/2011 | Dettori et al. | |

(Continued)

FOREIGN PATENT DOCUMENTS

KR    10-2006-0089366    8/2006

*Primary Examiner* — Chris Parry
*Assistant Examiner* — Abderrahmen Chouat
(74) *Attorney, Agent, or Firm* — Kile Park Reed & Houtteman PLLC

(57) ABSTRACT

Provided is a network management server that may select a resource entity corresponding to a resource to be allocated to a peer based on shared resource information, transmit resource allocation request information including resource release condition information to the selected resource entity, receive resource allocation result information from the selected resource entity in response to allocating the resource for the peer, based on the resource allocation request information, and transmit the resource allocation result information to the peer.

14 Claims, 7 Drawing Sheets

(58) Field of Classification Search
CPC ............ H04L 63/1416; H04L 63/1458; H04L 67/1002; H04L 67/1008; H04L 67/101; H04L 67/1023; H04L 67/1038; H04L 67/1057; H04L 67/1065; G06F 17/30209; G06F 17/30598; G06F 8/65; G06F 16/93; G06F 16/951; H04N 21/236; H04N 21/8456; H04N 21/6377; H04N 19/40; H04N 21/222; H04N 21/23106; H04N 21/2358; H04N 21/2662; H04N 21/64322; H04N 21/8547; H04N 21/632; H04N 21/25808; H04W 52/383; H04W 92/18; H04W 24/00; H04W 28/22; H04W 36/0011; H04W 36/14; H04W 36/30; H04W 52/38; H04W 52/48; H04W 52/50; H04W 76/10; H04W 76/23; H04W 80/04; H04W 80/06; H04W 84/18; H04W 88/06
See application file for complete search history.

(56) References Cited

U.S. PATENT DOCUMENTS

| | | |
|---|---|---|
| 2013/0007186 A1 | 1/2013 | Liu et al. |
| 2014/0019543 A1 | 1/2014 | Hyun et al. |
| 2014/0025770 A1* | 1/2014 | Warfield ........... G06F 15/17331 709/213 |
| 2014/0098777 A1* | 4/2014 | Lim .................. H04W 72/0413 370/329 |
| 2015/0023342 A1 | 1/2015 | Joo |
| 2015/0124582 A1 | 5/2015 | Campbell |
| 2018/0176827 A1* | 6/2018 | Sabater Maroto .... G06F 9/5072 |

* cited by examiner

METHOD OF MANAGING RESOURCE AND PEER-TO-PEER SYSTEM INCLUDING NETWORK MANAGEMENT SERVER

CROSS-REFERENCE TO RELATED APPLICATION(S)

This application claims the priority benefit of Korean Patent Application No. 10-2015-0158021 filed on Nov. 11, 2015, in the Korean Intellectual Property Office, the disclosure of which is incorporated herein by reference for all purposes.

BACKGROUND

1. Field

At least one example embodiment relates to technology for managing resources of a network.

2. Description of Related Art

A peer-to-peer (P2P) network refers to a distributed network in which a peer may transmit and receive content to and from another peer, instead of a server, through direct connection with the other peer. Accordingly, a peer may act as a client configured to receive content and may also act as a server configured to provide the content. Also, the P2P network may be formed based on shared content, instead of being formed based on a specific server. Accordingly, inter-peer connection and a network size may be flexible in the P2P network.

SUMMARY

According to an aspect of at least one example embodiment, there is provided a resource management method of a network management server, the method including selecting a resource entity corresponding to a resource to be allocated to a peer based on shared resource information; transmitting resource allocation request information including resource release condition information to the selected resource entity; receiving resource allocation result information from the selected resource entity, in response to allocating the resource for the peer, based on the resource allocation request information; and transmitting the resource allocation result information to the peer.

The resource management method may further include receiving the shared resource information from the resource entity; and allocating resource identification information to the resource entity based on the shared resource information.

The shared resource information may include at least one of information about a resource capacity of the resource entity and resource share time information.

The resource release condition information may include a first condition defined as a case in which a predetermined time is elapsed from an allocation point in time of the resource, a second condition defined as a case in which traffic of the resource exceeds predetermined maximum traffic, a third condition defined as a case in which a number of seeders joining a peer-to-peer (P2P) network exceeds a predetermined number of seeders, and a fourth condition defined as a case in which downloading of content is completed through the resource.

The resource management method may further include requesting the selected resource entity to release the resource, in response to a request from the peer for returning the resource; and receiving resource release result information from the selected resource entity.

The resource management method may further include deleting resource allocation information recorded to correspond to the resource, in response to receiving the resource release result information.

The resource management method may further include transmitting a status confirmation request to the selected resource entity, in response to a request from the peer for confirming a status of the selected resource entity due to an occurrence of an error at the selected resource entity; verifying whether another peer allocated with the resource is present, in response to absence of a response from the selected resource entity; and requesting the other peer to return the resource, and deleting resource allocation information recorded to correspond to the resource, in response to presence of the other peer.

The resource management method may further include verifying whether the peer uses the resource of the selected resource entity, in response to a resource share release request of the selected resource entity; and requesting the peer to return the resource in response to the peer using the resource.

According to another aspect of at least one example embodiment, there is provided a P2P system including a network management server configured to select a resource entity corresponding to a resource to be allocated to a peer based on shared resource information, transmit resource allocation request information including resource release condition information to the selected resource entity, receive resource allocation result information from the selected resource entity in response to allocating the resource for the peer, based on the resource allocation request information, and transmit the resource allocation result information to the peer.

The network management server may be further configured to receive the shared resource information from the resource entity, and to allocate resource identification information to the resource entity based on the shared resource information.

The shared resource information may include at least one of information about a resource capacity of the resource entity and resource share time information.

The resource release condition may include a first condition defined as a case in which a predetermined time is elapsed from an allocation point in time of the resource, a second condition defined as a case in which traffic of the resource exceeds predetermined maximum traffic, a third condition defined as a case in which a number of seeders joining a P2P network exceeds a predetermined number of seeders, and a fourth condition defined as a case in which downloading of content is completed through the resource.

The network management server may be further configured to request the selected resource entity to release the resource, in response to a request from the peer for returning the resource, and to receive resource release result information from the selected resource entity.

The network management server may be further configured to delete resource allocation information recorded to correspond to the resource, in response to receiving the resource release result information.

The network management server may be further configured to transmit a status confirmation request to the selected resource entity, in response to a request from the peer for confirming a status of the selected resource entity due to an occurrence of an error at the selected resource entity, to verify whether another peer allocated with the resource is present, in response to absence of a response from the selected resource entity, and to request the other peer to return the resource, and delete resource allocation information recorded to correspond to the resource, in response to presence of the other peer.

The network management server may be further configured to verify whether the peer uses the resource of the selected resource entity, in response to a resource share release request of the selected resource entity, and to request the peer to return the resource in response to the peer using the resource.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
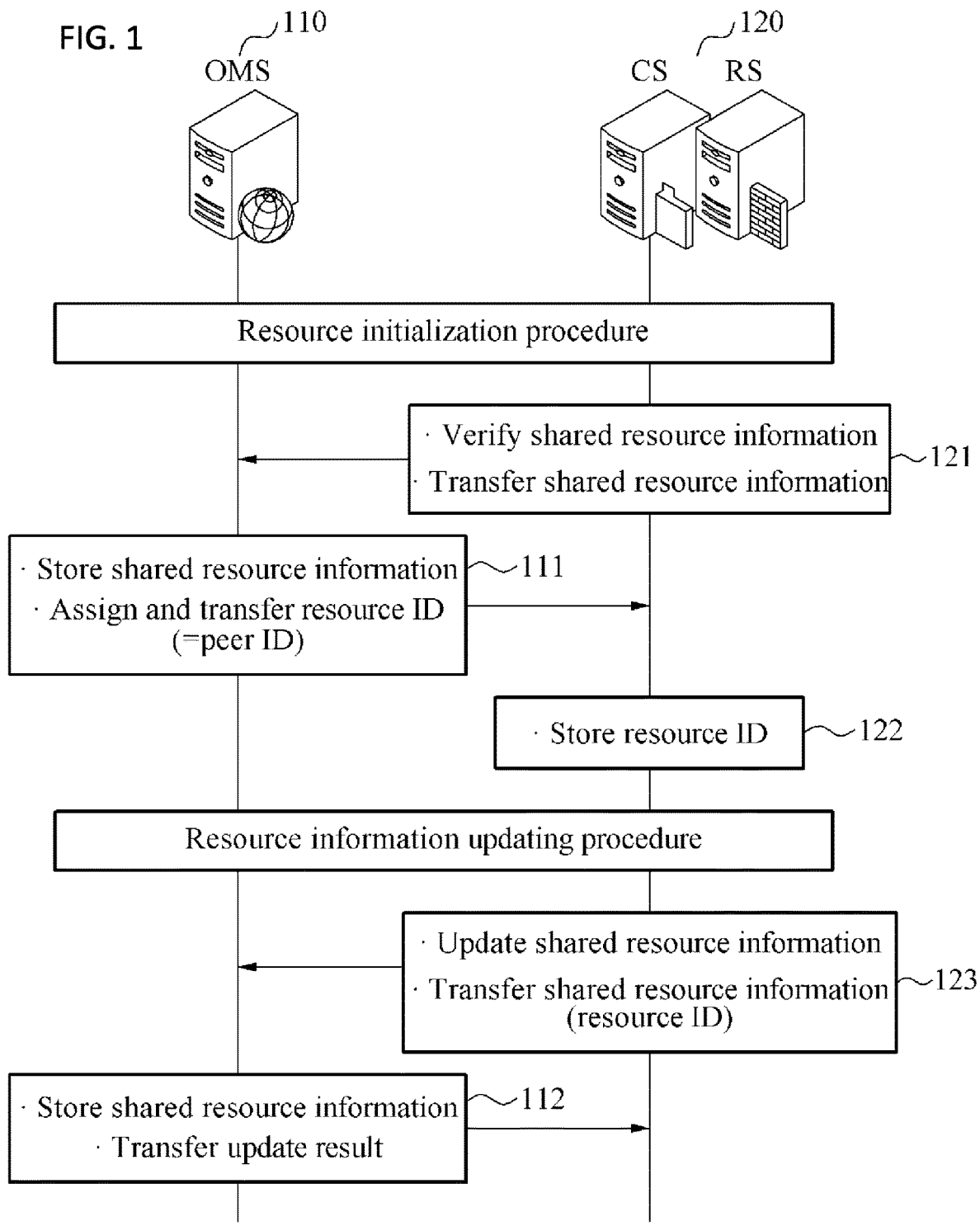
FIG. 1 illustrates an example of a resource initialization procedure and a resource information updating procedure according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

FIG. 1 illustrates an example of a resource initialization procedure and a resource information updating procedure according to an example embodiment.

<Resource Initialization Procedure>

A cache server (CS)/relay server (RS) 120 is a resource available at a peer-to-peer (P2P) network. A P2P network provider or a service provider may install the CS/RS 120. Also, a peer may act as the CS/RS 120, and may share a resource of the CS/RS 120 with another peer.

In operation 121, the CS/RS 120 may verify information (hereinafter, shared resource information) about a sharable resource at a resource initialization point in time, and may transfer shared resource information to an overlay network management server (OMS) 110. Information transferred from the CS/RS 120 to the OMS 110 may include an information element of the following Table 1.

TABLE 1

| Information name | Meaning |
| --- | --- |
| Type | Information indicating whether to act as CS or RS. Act as CS if set as "cs", and act as RS if set as "rs". |
| CS_url | Indicates the URL of CS registering the resource. It is valid only if the attribute type is set to the value "CS" |
| Network address | Indicates an address accessible to CS/RS in a network or indicates a network address of CS/RS registering the resource. Network address. Network address includes an IP address and a port No. |
| Expires | Indicates expiry time of sharing of CS/RS or indicates the expiration time in minutes of the resource for registration. After the expiration time, the resources of CS/RS are no longer valid. |
| resource-capacity | Indicates the resource capacity shared by CS/RS registering the resource or indicates information that constitutes shared resource information: max_storage_size indicating the maximum size of the storage for share. This attribute is used by CS uplink bandwidth or max_uplink_bandwidth indicating the maximum uplink bandwidth for share downlink bandwidth or max_downlink_bandwidth indicating the maximum downlink bandwidth for share number of connections or max_num_connection indicating the maximum number of connectivity possible for share number of overlay networks or max_num_overlay_network indicating the maximum number of overlay network possible to join by CS/RS includes even a sharable storage size in case of CS. |

In operation 111, the OMS 110 may store the shared resource information, may assign a resource ID, and may transfer the resource ID to the CS/RS 120. In detail, the OMS 110 may receive the shared resource information, may authenticate the CS/RS 120, and may verify whether the CS/RS 120 is suitable for a CS/RS function operation. That is, the OMS 110 may determine whether the CS/RS 120 is capable of sufficiently performing a CS/RS resource sharing role in the overlay network. If the CS/RS 120 is suitable for the CS/RS function operation, the OMS 110 may store the shared resource information, and may assign an ID, for example, a peer ID, of a resource that the CS/RS 120 may use for P2P networking. That is, the OMS 110 may assign a resource ID used when the CS/RS 120 joins the overlay network. Also, the OMS 110 may transfer the resource ID to the CS/RS 120. In operation 122, the CS/RS 120 may store the assigned resource ID.

<Resource Information Updating Procedure>

A shared resource may be changed during an operation of the CS/RS 120. For example, memory available at the P2P network may increase/decrease and a shared resource may be changed accordingly. Also, the shared resource may be changed in response to a change in a network bandwidth. If the shared resource is changed, the CS/RS 120 may notify the OMS 110 of updating shared resource information. Information used to notify updating of the shared resource information may include information of the following Table 2.

TABLE 2

| Information name | Meaning |
| --- | --- |
| Resource ID | Resource identifier |
| Type | Indicates type of node sharing the resource. Its value shall be set to either "CS" or "RS". Alternatively, Type is information indicating whether to act as CS or RS. Act as CS if set as "cs", and act as RS if set as "rs". |
| Network address | Indicates an address accessible to CS/RS in a network, and includes an IP address and a port No. |
| Expires | Indicates expiry time of sharing of CS/RS or indicates the expiration time in minutes of the resource. After the expiration time, the resources of CS/RS are no longer valid. |
| resource-capacity | Indicates the resource capacity shared by CS/RS registering the resource or indicates information that constitutes shared resource information: max_storage_size indicating the maximum size of the storage for share. This attribute is used by CS uplink bandwidth or max_uplink_bandwidth indicating the maximum uplink bandwidth for share downlink bandwidth or max_downlink_bandwidth indicating the maximum downlink bandwidth for share number of connections or max_num_connection indicating the maximum number of connectivity possible for share number of overlay networks or max_num_overlay network indicating the maximum number of overlay network possible to join by CS/RS- includes even a sharable storage size in case of CS. |

In operation 123, the CS/RS 120 may update the shared resource information and may transmit the updated or modified shared resource information to the OMS 110. For example, the CS/RS 120 may transfer a resource ID of the changed shared resource to the OMS 110. That is, if the shared resource is changed, the CS/RS 120 may request the OMS 110 to modify the shared resource information. In operation 112, the OMS 110 may store the modified shared resource information or may modify the shared resource information, and may transmit a result of storing or a result of modifying to the CS/RS 120.

<Shared Resource Keep-Alive Procedure>

Although not illustrated in FIG. 1, a resource, that is, the CS/RS 120 may periodically notify the OMS 110 of shared resource information of the CS/RS 120. The OMS 110 may verify that the resource normally operates by periodically receiving the shared resource information. Also, since the shared resource information is periodically transmitted to the OMS 110, a status of shared resource information may be refreshed. In this case, inconsistency of shared resource information between the OMS 110 and the CS/RS 120 may be prevented.

<Resource Allocation Procedure>

Figure 2:
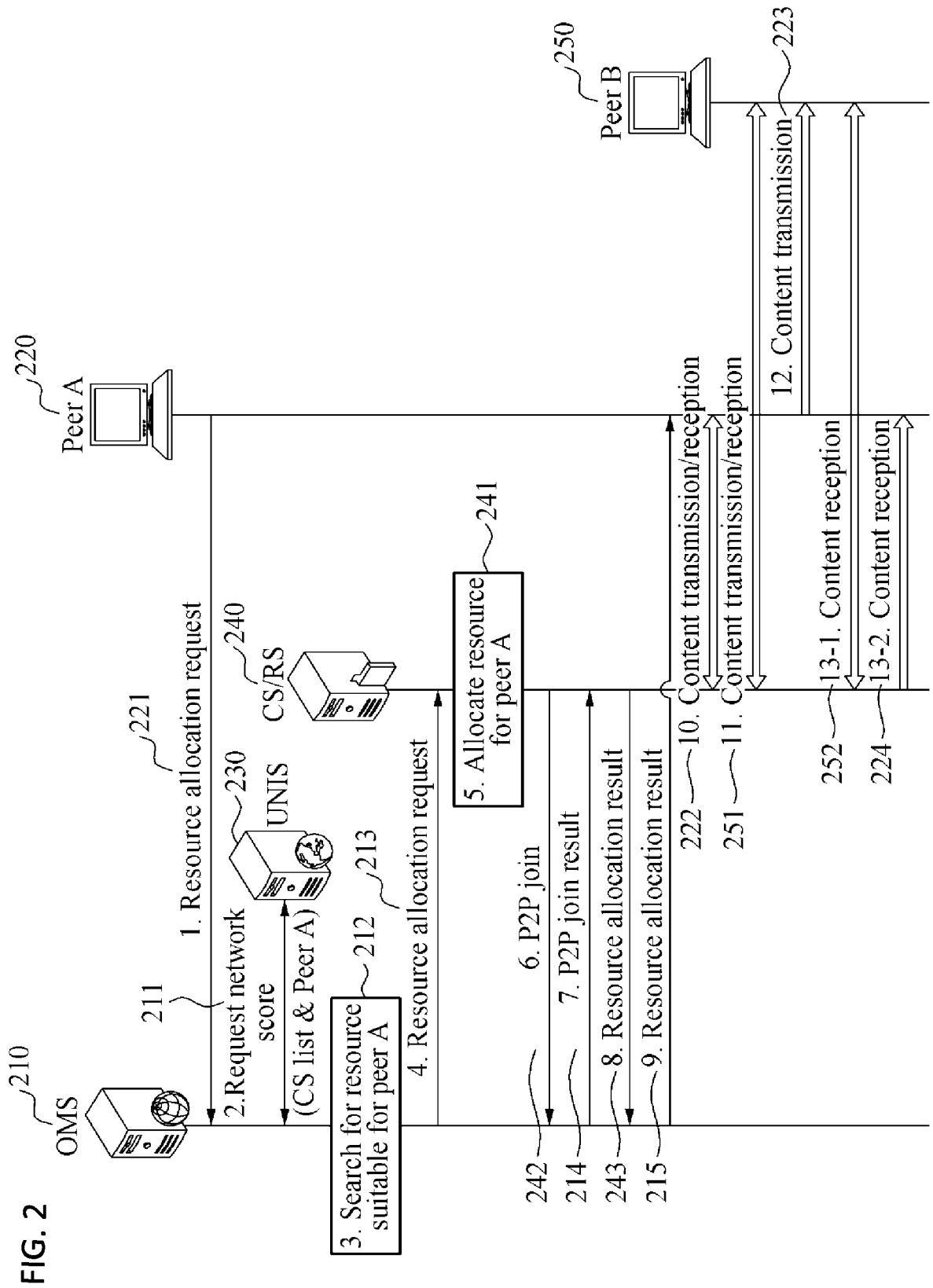
FIG. 2 illustrates an example of a resource allocation procedure according to an example embodiment.

FIG. 2 illustrates an example of a resource allocation procedure according to an example embodiment.

In a P2P-based overlay network, a peer 220 may request an OMS 210 for resource allocation. Also, the OMS 210 may perform resource allocation. In the following environments, CS/RS resources may be allocated.

1. In response to a request from the OMS 210 or the peer 220 for resource allocation in a situation in which content distribution is not smooth, for example, in which a P2P-based overlay network is newly created, at least one CS may be allocated to the OMS 210 or the peer 220. Here, the peer 220 acts as a content provider. The CS operates as follows:

(1) The CS may receive content from a content provider, that is, the peer 220, and may distribute the received content.

(2) If the CS joins an overlay network during a predetermined period of time and the time is expired, the CS may terminate joining of the overlay network.

(3) If the CS has transmitted/received a predetermined amount of traffic, the CS may terminate joining of the overlay network.

(4) Once a number of seeders corresponding to a predetermined number are created, the CS may terminate joining of the overlay network. Here, the seeder refers to the peer 220 that holds perfect content.

(5) In response to a return/release allocated resource command received from the OMS 210, the CS may terminate joining of the overlay network. Unless a leave condition of the overlay network is defined, the CS may receive the return/release allocated resource command from the OMS 210.

2. In a situation in which the peer 220 desires to receive content, however, may not join the P2P-based overlay network, the peer 220 may request the CS to receive content and the CS may receive the content in place of the peer 220. The CS may perform a peer role. The CS operates as follows:

(1) Once all of the requested contents are received, the CS may terminate the peer role.

(2) The CS informs the peer 220 that reception of the contents is completed. Here, the CS may notify the peer 220 of the content reception through an email or a contact of the peer 220 based on an out-of-band scheme.

(3) Once the peer 220 is connected to the CS, the CS may transfer the content to the peer 220. That is, the peer 220 may receive the content from the CS. Once the content is transferred from the CS to the peer 220, the CS may delete the content.

(4) The CS maintains the content during a predetermined period of time. For example, the CS may maintain the content by the expiry time described with Table 1. Here, if the time is set to 0, the CS may wait permanently until the peer 220 receives the content.

3. In a situation in which the peer 220 desires to distribute the content, however, may not join the P2P-based overlay network, the peer 220 may request the CS for content distribution. The CS may distribute the content in place of the peer 220. The CS operates as follows:

(1) The CS may receive content from the peer 220, and the CS may join the P2P-based overlay network and distribute the content in place of the peer 220.

(2) The CS may join the overlay network only during a predetermined period of time, and if a predetermined time is expired, may leave the overlay network.

(3) If the CS has transmitted/received a predetermined amount of traffic, the CS may leave the overlay network.

(4) In response to a return/release allocated resource command received from the OMS 210, the CS leave the overlay network. Unless a leave condition of the overlay network is defined, the CS may receive the return/release allocated resource command from the OMS 210.

4. If the peer 220 is located at rear of NAT/Firewall, the peer 220 may not receive contents from other peers. The peer 220 may be allocated with an RS, and may receive content retransmitted from the RS. The peer 220 may transmit the content to other peers. The other peer may transfer content to the peer 220 through the RS. The RS operates as follows:

(1) If the RS joins the overlay network during a predetermined period of time and a predetermined time is expired, the RS may terminate a retransmission function. Here, if the peer 220 desires to continuously join the overlay network, another RS may be allocated.

(2) If the RS has transferred a predetermined amount of traffic, the RS may terminate the retransmission function. Here, if the peer 220 desires to continuously join the overlay network, another RS may be allocated.

(3) In response to a return/release allocated resource command received from the OMS 210 or the peer 220 leaving the overlay network, the RS may terminate participating the overlay network. Unless a leave condition of the overlay network is not defined, the RS may receive the return/release allocated resource command from the OMS 210.

Referring to FIG. 2, in operation 221, the peer 220 may request the OMS 210 for resource allocation. When requesting the OMS 210 for resource allocation, the peer 220 may transmit information of the following Table 3 to the OMS 210.

TABLE 3

| Information name | Meaning |
| --- | --- |
| IXS server URL | Indicates overlay join related information including an overlay ID, for example, a specific channel of an index server (IXS). |
| Requester Peer ID | Identifier of peer having requested resource allocation (Peer ID). |
| Action Type | Indicates a resource use purpose. Action type includes information as follows:<br>"peer": request for acting as peer (related to the aforementioned No. 1)<br>"download": content download request (related to the aforementioned No. 2)<br>"upload": content upload request (related to the aforementioned No. 3)<br>"relay": request for acting as RS (related to the aforementioned No. 4) |
| Notification Address | indicates an address to which an event is transferred in response to occurrence of the event (e.g., an email address of peer) |
| Reserve Condition | Indicates resource reserve condition. Reserve condition includes information as follows as:<br>storage size: storage capacity to be allocated<br>max upload bandwidth: maximum upload bandwidth to be allocated |

TABLE 3-continued

| Information name | Meaning |
| --- | --- |
| | max download bandwidth: maximum download bandwidth to be allocated<br>max number of connections: number of maximum P2P connections to be allocated |
| Leave Condition | Indicates resource return condition or resource release condition. Leave condition includes information as follows as:<br>Timeout: resource allocation request during predetermined period of time. The timeout indicates the timeout time of resource usage. The resource is returned after the expiration of the values in attribute timeout.<br>Max traffic: allocation request until CS/RS has transferred a designated traffic amount. The Max traffic indicates the network traffic volume processed by the CS/RS. The resource is returned after the CS/RS has processed the specified traffic volume.<br>Number of seeders: allocation until a seeder exceeding a determined number of seeders is found in overlay network. The resource is returned after the number of seeders has reached specified value in attribute num_seeder. Note, overlay network tends to be stable when there are sufficient number of seeds.<br>Completed or Service completion: Allocation until content distribution is completed. The Service completion indicates the return of resource after the requested task is completed. |

The peer 220 may transmit resource release condition information to the OMS 210. In detail, if a resource release condition is satisfied while using a resource, a resource allocated to the peer 220 may be released. The resource release condition information includes conditions, for example, timeout, max traffic, number of seeders, and completed. Hereinafter, each of the conditions will be described.

(1) Timeout: If a resource, for example, a CS/RS, is allocated, a timer of the resource may operate. After timeout, the resource may be released. Optionally, the resource may notify the OMS 210 of resource release related information.

(2) Max traffic: The resource, for example, the CS/RS, may measure an amount of traffic transmitted/received, and if the measured amount of traffic exceeds a predetermined max traffic, the resource may be released. Optionally, the resource may notify the OMS 210 of resource release related information.

(3) Number of seeders: If a number of seeders joining the overlay network exceeds a predetermined number of seeders, the resource may be released. Optionally, the resource may notify the OMS 210 of resource release related information.

(4) Completed: If the CS is allocated for content download (the aforementioned No. 2) and has downloaded all of the contents, the resource may notify the peer 220 of completion of download through a contact of the peer 220, for example, a notification address of the peer 220. Once the peer 220 copies the content, the resource may delete the content. Alternatively, if a predetermined period of time is elapsed, that is, after timeout, the resource may delete the content.

The peer 220 may transmit, to the OMS 210, resource allocation request information in which at least one of the conditions, for example, timeout, max traffic, number of seeders, and completed, is set.

Without a resource allocation request from the peer 220, the OMS 210 may determine whether resource allocation is required, and if the resource allocation is determined to be required, may allocate a resource. In a situation in which the OMS 210 is to allocate the resource, the OMS 210 may allocate a most appropriate resource, for example, an RS/CS 240. In the case of the aforementioned No. 1, the OMS 210 may select a resource relatively far away from the peer 220 having requested the resource allocation, and may allocate the selected resource to the peer 220. Also, in the case of the aforementioned Nos. 2 to 4, the OMS 210 may select and allocate a resource relatively close to the peer 220. In operation 211, the OMS 210 may use all of information, for example, a resource status, etc., of the OMS 210 to select a resource. For example, the OMS 210 may interwork with an underlying network information server (UNIS) 230.

The UNIS 230 may manage underlying network information to configure a P2P network to which the underlying network information is applied, and may provide information to other entities. The UNIS 230 may be positioned on an Internet service provider (ISP) domain, and may provide the underlying network information, network management policy information, etc., to a peer and a server that are positioned on a P2P service provider (P2PSP) domain or a user domain. The UNIS 230 may provide network distance information between peers on the P2P network.

In operation 212, the OMS 210 may retrieve a resource most suitable for the peer 220, and may select the resource. For example, the OMS 210 may select a resource having some resource allocation capacity based on a resource status, for example, statuses of resources managed at the OMS 210.

In operation 213, the OMS 210 may request the selected resource for resource location. Information transferred from the OMS 210 to the selected resource may include information of Table 3.

If the selected resource is a CS, the CS may allocate a resource for the peer 220 in operation 241, and may join the overlay network which the peer 220 joins in operation 242. In operation 214, the CS may receive information about a join result from the OMS 210. If the selected resource is an RS, a procedure of joining the overlay network may not be required.

In operation 243, the selected resource, for example, the CS or the RS may transfer a resource allocation result to the OMS 210. Here, the selected resource may transfer information of Table 4 to the OMS 210.

TABLE 4

| Information name | Meaning |
| --- | --- |
| Result | Indicates resource allocation result. Success or error of resource allocation may be indicated. If result is indicated as error, cause of error may be indicated. If resource allocation is success, the following information may be transferred to the OMS 210. |
| Resource ID | Resource identifier. The Resource ID indicates the identifier of the resource to be used for this reservation. |
| Virtual peer ID | If selected resource is CS, virtual peer ID is set. Virtual peer ID indicates identifier used when CS operates as peer in overlay network. |
| Relay session ID | If selected resource is RS, relay session ID is set. Indicates a session identifier for relay. If RS is to restart and to rejoin overlay network due to error, new relay session is created. Here, existing relay session is faded out due to TCP session timeout. |
| Relay instance Id | Relay instance Id indicates the identification used by the reserved overlay resource in RS. When a peer needs to re-join the overlay network (i.e., in case of restart), new relay instance can be allocated with the original relay instance being timeout. |
| Expires | Indicates expiry time or allocation time of selected resource or indicates the maximum time that the overlay resource is allocated for this reservation. |

TABLE 4-continued

| Information name | Meaning |
| --- | --- |
| Network Address | Corresponds to a network IP address and a port address of resource or indicates network address and port of the reserved overlay resource. |
| Link | In the case of upload/download (corresponding to Nos. 2/3 of 4.3), address used to upload or download corresponding content (e.g., FTP). The link indicates the link address of the virtual peer when uploading/downloading contents. This attribute is used when the attribute action_type is set to "UPLOAD" or "DOWNLOAD". |

In operation 215, the OMS 210 may transfer resource information to the peer 220. Here, information transferred from the OMS 210 to the peer 220 may include information of Table 4. If the OMS 210 itself allocates a resource, not in response to a resource allocation from the peer 220, operation 215 is omitted.

If the resource is allocated to the peer 220, the resource may operate as follows.

If the resource is allocated for acting as a peer (corresponding to the aforementioned No. 1), the resource, that is, the CS may operate as the peer. For example, the CS may transmit and receive content to and from the peer 220 in operation 222, and may transmit and receive the content to and from another peer 250 in operation 251.

If the resource is allocated for content download (corresponding to the aforementioned No. 2), the resource, that is, the CS may receive the content from the other peer 250 in operation 251 and may transfer the received content to the peer 220 in operation 222.

If the resource is allocated for content upload (corresponding to the aforementioned No. 3), the resource, that is, the CS may receive the content from the peer 220 in operation 222 and may transfer the received content to the other peer 250 in operation 251.

In the case of No. 4, the peer 220 may transfer the content to the other peer 250 in operation 223, however, may not receive the content from the other peer 250. The resource, that is, the RS may receive specific content from the other peer 250 in operation 252, and may transfer the specific content to the peer 220 in operation 224.

Figure 3:
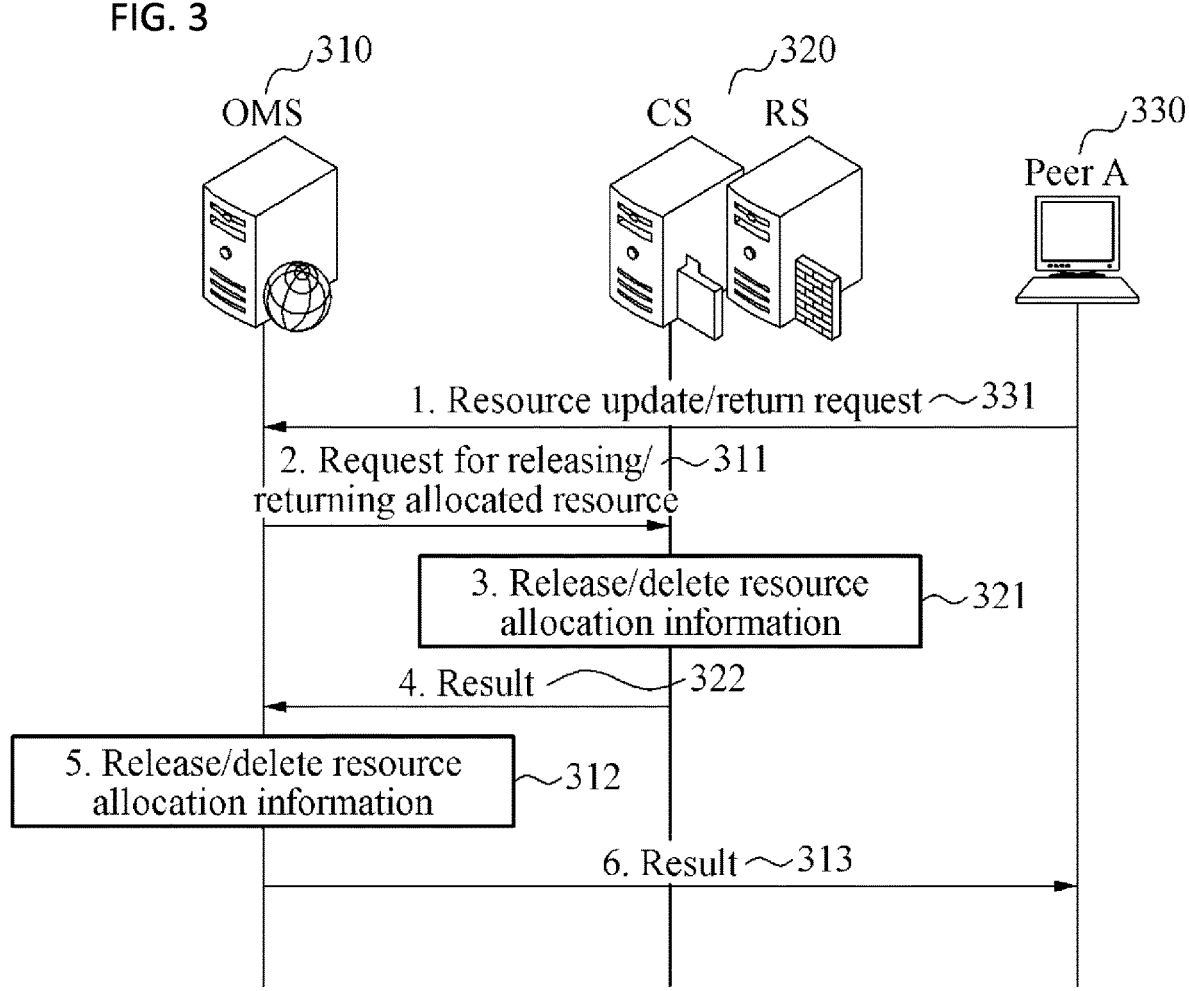
FIG. 3 illustrates an example of a resource information updating and returning procedure according to an example embodiment.

FIG. 3 illustrates an example of a resource information updating and returning procedure according to an example embodiment.

<Resource Returning Procedure>

If a resource is not required anymore, the resource returning procedure may be initiated to release/return the allocated resource.

Referring to FIG. 3, in operation 331, a peer 330 may transmit a resource return request to an OMS 310. That is, the peer 330 may notify the OMS 310 of returning the resource. If the resource is not required, the peer 330 may transmit, to the OMS 310, an identifier, for example, a virtual peer ID or a relay session ID, of the resource to be returned. If the resource allocated to the peer 330 is a CS, the peer 330 may transmit the virtual peer ID to the OMS 310. If the resource allocated to the peer 330 is an RS, the peer 330 may transmit the relay session ID to the OMS 310.

If the resource is allocated or the peer 330 maintains information of a CS/RS 320 based on the determination of the OMS 310, not in response to a resource allocation from the peer 330, operation 331 may be omitted. If operation 331 is omitted, the OMS 310 may determine whether to return the resource.

In operation 311, the OMS 310 may transmit a request for releasing or returning the allocated resource to the CS/RS 320 corresponding to the virtual peer ID or the relay session ID.

In operation 321, the CS/RS 320 may delete resource allocation information. The CS/RS 320 may release the allocated resource corresponding to the virtual peer ID or the relay session ID. In operation 322, the CS/RS 320 may notify the OMS 310 of the release result. The OMS 310 may delete resource allocation information in operation 312, and may transfer a result of deleting the resource allocation information to the peer 330 in operation 313.

If the resource is allocated based on the determination of the OMS 310, not in response to the resource allocation request from the peer 310, operation 313 may be omitted.

<Resource Information Updating Procedure>

Information about the resource allocated to the peer 330 may be modified. In this case, in operation 331, the peer 330 may transmit a resource information update request to the OMS 310. If the resource is allocated or the peer 330 maintains information of the CS/RS 320 based on the determination of the OMS 310, not in response to the resource allocation request from the peer 330, operation 331 may be omitted. If operation 331 is omitted, the OMS 310 may determine whether to update the resource information.

The peer 330 may transfer information of Table 5 to the OMS 310, and may request updating of information of Table 5.

TABLE 5

| Information name | Meaning |
|---|---|
| Resource ID | Resource identifier |
| Virtual peer ID | Indicates identifier for CS to act as peer in overlay network. |
| Relay session ID | Indicates session identifier for relay. |
| Reserve Condition | Indicates resource reserve condition. Reserve condition includes information as follows:<br>storage size: storage capacity to be allocated<br>max upload bandwidth: maximum upload bandwidth to be allocated<br>max download bandwidth: maximum download bandwidth to be allocated<br>max number of connections: number of maximum P2P connections to be allocated |
| Leave Condition | Indicates resource return condition or resource release condition. Leave condition includes information as follows as:<br>Timeout: resource allocation request during predetermined period of time. The timeout indicates the timeout time of resource usage. The resource is returned after the expiration of the values in attribute timeout.<br>Max traffic: allocation request until CS/RS has transferred a designated traffic amount. The Max traffic indicates the network traffic volume processed by the CS/RS. The resource is returned after the CS/RS has processed the specified traffic volume.<br>Number of seeders: allocation until a seeder exceeding a determined number of seeders is found in overlay network.<br>The resource is returned after the number of seeders has reached specified value in attribute num_seeder. Note, overlay network tends to be stable when there are sufficient number of seeds.<br>Completed or Service completion: Allocation until content distribution is completed. The Service completion indicates the return of resource after the requested task is completed. |

The OMS 310 may transmit a resource information update request to the CS/RS 320. Here, the OMS 310 may request the CS/RS 320 for updating information of Table 5.

<Verifying Resource Allocation Status Information>

An operation manager, an OMS, or a peer may verify information about an allocation status of a resource currently being used.

The operation manager may request information about allocation statuses of entire resources.

Also, the operation manager may request information about an allocation status of a specific resource, for example, a CS and an RS. Here, the operation manager may designate a virtual peer ID corresponding to the CS and may designate a relay session ID corresponding to the RS.

The OMS may request information about an allocation status of a specific resource, for example, a CS and an RS.

The peer may request information about an allocation status of a resource, for example, a CS/RS, allocated to the peer. Here, the peer may designate a peer ID of the peer itself and may request information about the allocation status of the resource, for example, the CS/RS.

Information about the allocation status of the resource, for example, the CS may include information of Table 6.

TABLE 6

| Information name | Meaning |
|---|---|
| Overlay ID | Indicates identifier of joining overlay network or indicates the overlay identification that the resource of CS is allocated. |
| Virtual peer ID | Indicates identifier used when CS acts as peer in overlay network or indicates the identification used by CS in participating as a peer in the overlay network |
| Action Type | Indicates a resource use purpose or indicates the type of action performed by CS. Action type includes information as follows as:<br>"peer": request for acting as peer (related to the aforementioned No. 1)<br>"download": content download request (related to the aforementioned No. 2)<br>"upload": content upload request (related to the aforementioned No. 3) |
| Requester peer ID | Indicates identifier of peer to which resource is allocated or indicates the identification of a peer using the resource of CS. The attribute is not used when there is no specific peer is involved in CS resource allocation. |
| Expires | Indicates expiry time or allocation time of selected resource or indicates the expiration time in minutes of the CS resource. |
| Resource Status(or, reservation status) | Indicates a current resource use status or indicates an amount of resources of CS that has been allocated. Resource status includes information as follows:<br>storage usage: allocated storage capacity<br>uplink(or upload) traffic: used uplink traffic or an upload network traffic volume processed.<br>downlink(or download) traffic: used downlink traffic or a download network traffic volume processed<br>uplink bandwidth: used uplink bandwidth or uplink bandwidth reserved<br>downlink bandwidth: used downlink bandwidth or downlink bandwidth reserved<br>number of connections: number of P2P connections being used or number of connectivity reserved |

Information about the allocation status of the resource, for example, the RS may include information of Table 7.

TABLE 7

| Information name | Meaning |
|---|---|
| Requester peer ID | Indicates identifier of peer to which resource is allocated or indicates the identification of a peer using the resource of RS. |

TABLE 7-continued

| Information name | Meaning |
| --- | --- |
| Relay instance ID | Indicates the relay instance identification. |
| Relay session ID | Indicates identifier of session for relay. |
| Expires | Indicates expiry time or allocation time of selected resource or indicates the expiration time in minutes of the RS resource. |
| Network Address | Indicates network IP address and port address of RS. |
| Resource Status | Indicates a current RS use status or indicates the amount of resources of RS that has been allocated. Resource status includes information as follows: storage size: size of the storage reserved. This attribute pertains to CS. storage usage: allocated storage capacity uplink(or upload) traffic: used uplink traffic or the upload network traffic volume processed downlink(or download) traffic: used downlink traffic or download network traffic volume processed uplink bandwidth: using uplink bandwidth or uplink bandwidth reserved downlink bandwidth: used downlink bandwidth or uplink bandwidth reserved number of connections: number of P2P connections being used or number of connectivity reserved |

That is, the operation manager, the OMS, or the peer may verify information of Table 6 and information of Table 7.

<Resource Error Procedure>

Figure 4:
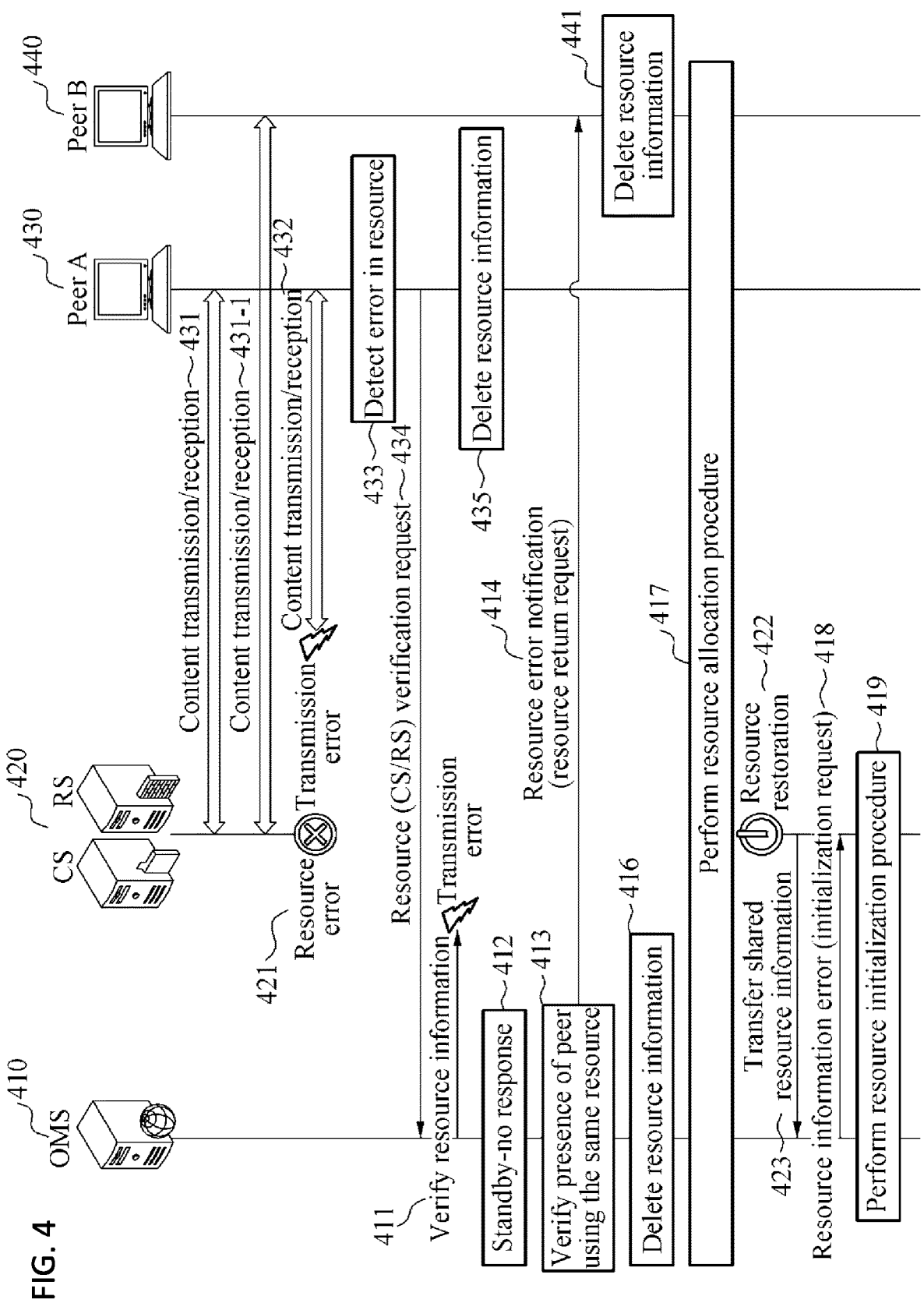
FIG. 4 illustrates an example of a resource error procedure according to an example embodiment.

FIG. 4 illustrates an example of a resource error procedure according to an example embodiment.

Referring to FIG. 4, peers 430 and 440 may receive a service provided from a resource, for example, a CS/RS, 420. For example, the peer 430 may transmit and receive content to and from the resource 420 in operation 431, and the peer 440 may transmit and receive content to and from the resource 420 in operation 431-1. In this instance, in operation 421, an error may occur in the resource 420. Due to the error, content transmission and reception may become impossible in operation 432. In operation 433, the peer 430 may detect the error.

Since the resource 420 is unavailable, the peer 430 may request an OMS 410 for verifying a status of the resource 420 in operation 434. Also, since the resource 420 is unavailable, the peer 430 may delete information about the resource 420 in operation 435. If a resource is continuously required, the peer 430 may request the OMS 410 to allocate a new resource in operation 417.

In response to a status verification request from the peer 430, the OMS 410 may verify the status of the resource 420 in operation 411. The OMS 410 may operate in the same manner as the aforementioned procedure of verifying resource allocation status information. For example, the OMS 410 may request the resource 420 for information of Table 6 and/or Table 7.

If the resource 420 does not operate due to the occurrence of the error in the resource 420, the resource 420 may not transmit a response. The OMS 410 may perform operation 411 repeatedly, for example, twice or three times. If there is no response from the resource 420 in operation 412, the OMS 410 may recognize that the error has occurred in the resource 420. Also, the OMS 410 starts a procedure for deleting resource information. For example, in operation 413, the OMS 410 may verify whether the same resource is allocated to another peer. If the peer 440 shares the same resource as the peer 430, the OMS 410 may notify the peer 440 that the error has occurred in the resource 420, and may request the peer 440 for resource return in operation 414. In operation 416, the OMS 410 may delete resource information.

In operation 441, the peer 440 may delete resource information. If a resource is continuously required, the peer 440 may request the OMS 410 to allocate a new resource in operation 417.

In operation 422, the resource 420 may be restored. In this case, the resource 420 may be unaware that a resource error procedure has started. Accordingly, in operation 423, the resource 420 may provide resource information to the OMS 410. As described above, the OMS 410 has deleted information of the resource 420 and thus, may not identify the resource 420 having provided the resource information. That is, the OMS 410 has received the resource information from the resource 420 the OMS 410 is unaware of and thus, may notify the resource 420 of an error and may request the resource 420 for initialization in operation 418.

In operation 419, the resource 420 may initiate a resource initialization procedure as described above with FIG. 1.

<Resource Share Release Procedure>

Figure 5:
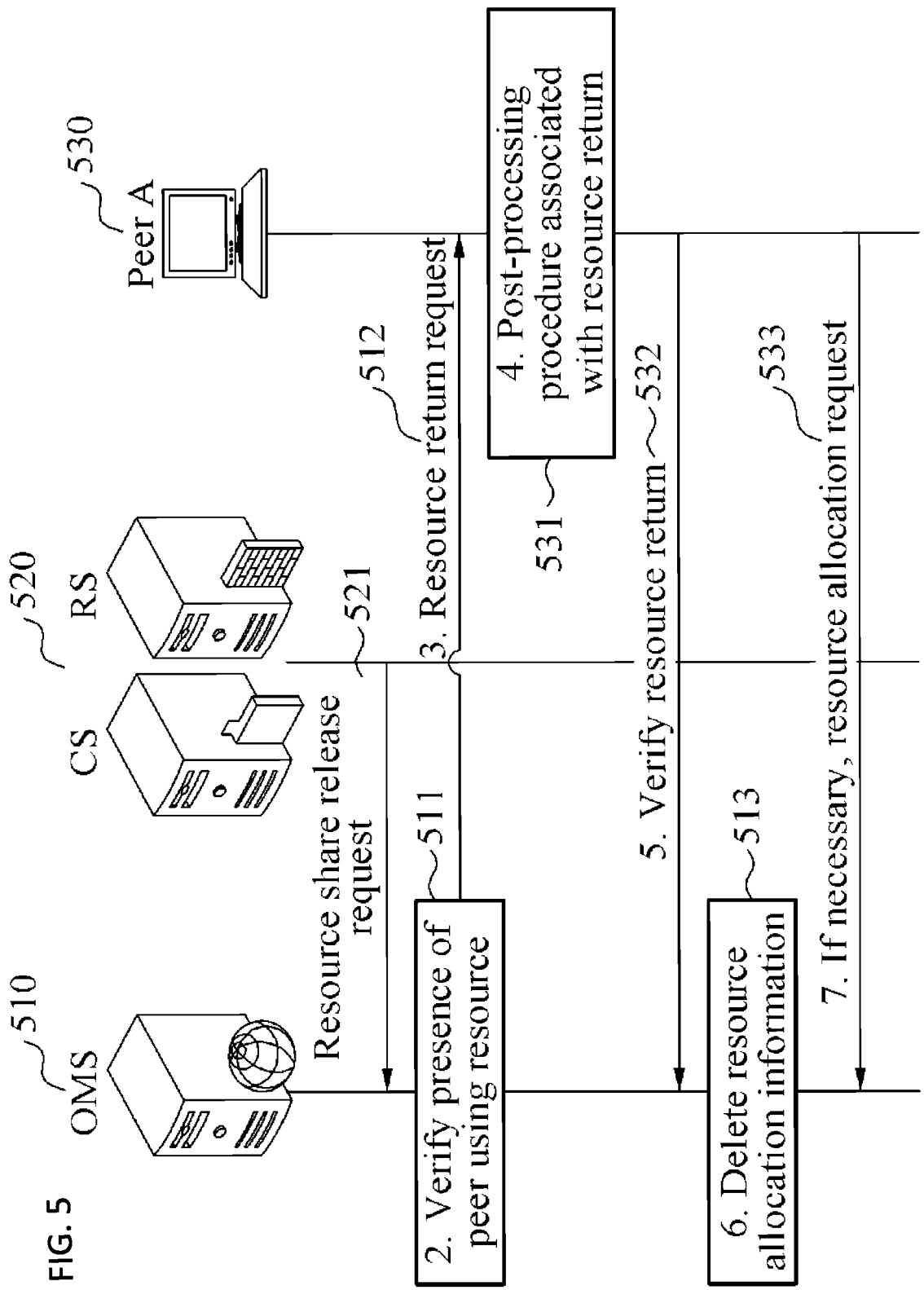
FIG. 5 illustrates an example of a resource share release procedure according to an example embodiment.

FIG. 5 illustrates an example of a resource share release procedure according to an example embodiment.

If a CS/RS 520 does not share a resource anymore, the CS/RS 520 may release sharing of the resource.

Referring to FIG. 5, in operation 521, the CS/RS 520 may request an OMS 510 to release sharing of the resource (hereinafter, resource share release). For example, the CS/RS 520 may request the OMS 510 for the resource share release by transmitting a resource ID of the CS/RS 520 to the OMS 510.

In operation 511, the OMS 510 may verify whether a peer 530 using a resource is present. If the peer 530 uses the resource, the OMS 510 may request the peer 530 to return the resource in operation 512. In operation 531, the peer 530 may return the resource and may initiate a post-processing procedure associated with resource return. In operation 532, the peer 430 may notify the OMS 510 that the peer 430 has returned the resource.

The resource return related post-processing procedure of the peer 530 follows as:

In response to allocating a resource for acting as a peer (corresponding to the aforementioned No. 1) and receiving a resource share release request of the resource, the peer 530 may return the resource and may be allocated with another resource, for example, a CS in operation 533.

In response to allocating a resource for content download (corresponding to the aforementioned No. 2) and receiving a resource share release request of the resource, the peer 530 may receive content being downloaded to the CS so far. If the peer 530 desires to continue downloading of the content, the peer 530 may be allocated with another resource, for example, the CS in operation 533. Also, the resource may continuously transfer the content to the peer 530 by joining an overlay network as a general peer.

Even in response to allocating a resource for content upload (corresponding to the aforementioned No. 3) and receiving a resource share release request of the resource, the peer 530 may desire to continue to upload the content. In this case, the peer 530 may be allocated with another resource, for example, the CS in operation 533.

Even in response to allocating a resource for relay (corresponding to the aforementioned No. 4) and receiving a resource share release request of the resource, the peer 530 may require a server to perform retransmission. In this case, the peer 530 may be allocated with another resource, for example, an RS in operation 533.

In operation 513, the OMS 510 may delete resource allocation information of the CS/RS 520.

Figure 6:
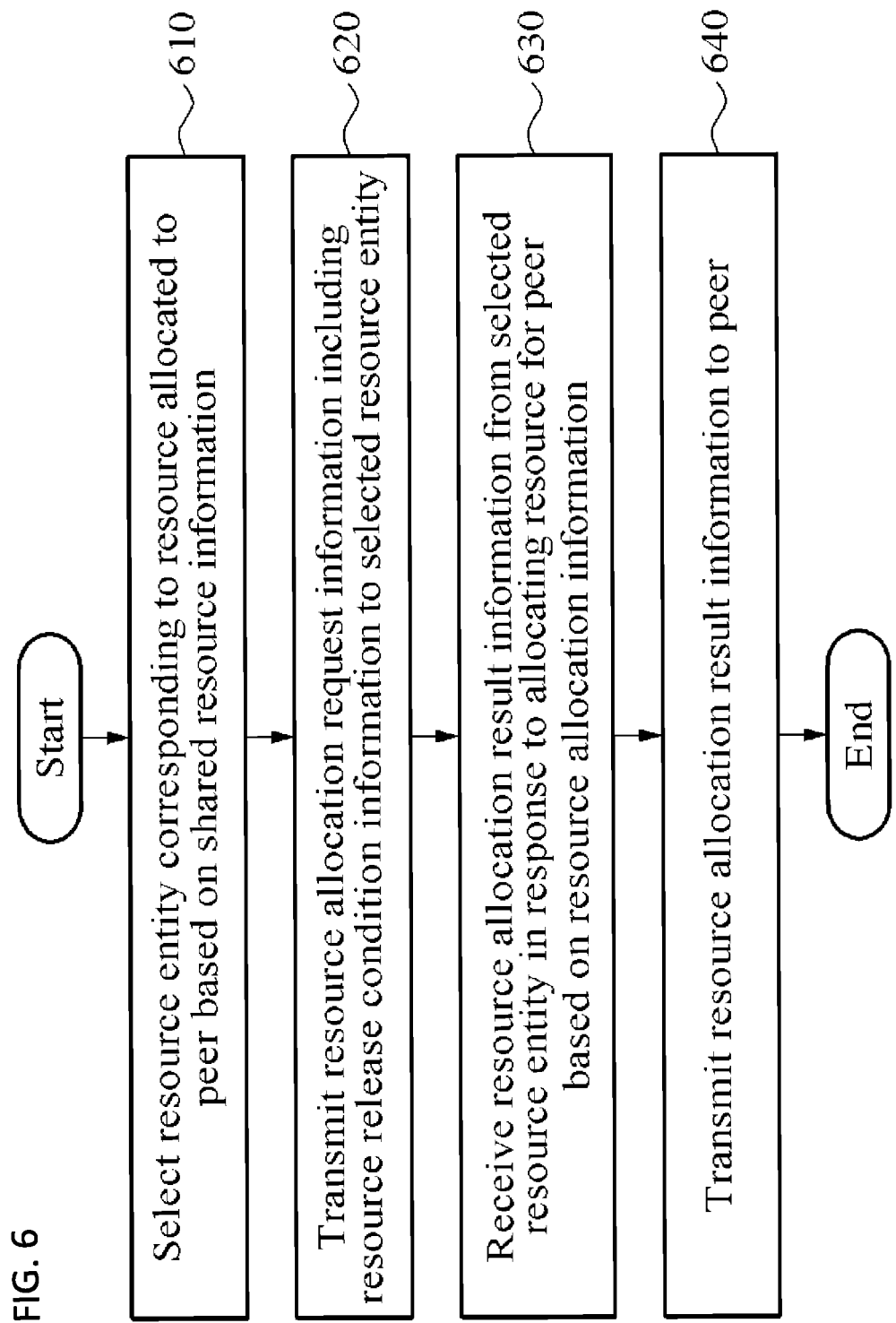
FIG. 6 is a flowchart illustrating a resource management method of a network management server according to an example embodiment.

FIG. 6 is a flowchart illustrating a resource management method of a network management server according to an example embodiment.

Referring to FIG. 6, in operation 610, the network management server may select a resource entity corresponding to a resource allocated to a peer based on shared resource information. Here, the resource entity may be a CS and/or an RS. The network management server may receive the shared resource information from the resource entity. Here, the shared resource information may include information of Table 1. The network management server may allocate resource identification information to the resource entity based on the shared resource information.

In operation 620, the network management server may transmit resource allocation request information including resource release condition information to the selected resource entity. The resource allocation request information may include information of Table 3. The resource release condition information may include the aforementioned leave condition. The resource release condition information may include at least one of a first condition defined as a case in which a predetermined time is elapsed from an allocation point in time of the resource, a second condition defined as a case in which traffic of the resource exceeds predetermined maximum traffic, a third condition defined as a case in which a number of seeders joining a P2P network exceeds a predetermined number of seeders, and a fourth condition defined as a case in which downloading of content is completed through the resource.

In operation 630, in response to allocating the resource for the peer based on the resource allocation information, the network management server may receive resource allocation result information from the selected resource entity.

In operation 640, the network management server may transmit the resource allocation result information to the peer.

If the resource is not required anymore, the peer may return the resource. In this case, the peer may transmit a virtual peer ID or a relay session ID of the resource to be returned to the server. In response to a request for returning the resource from the peer, the network management server may request the selected resource entity to release the resource. The network management server may receive resource release result information from the selected resource entity. Once the resource release result information is received, the network management server may delete resource allocation information recorded to correspond to the resource.

According to example embodiments, due to an occurrence of an error in the selected resource entity, the network management server may receive a request for verifying a status of the selected resource entity from the peer. In this case, the network management server may transmit a status verification request to the selected resource entity. In response to absence of a response from the selected resource entity, the network management server may verify whether the resource is allocated to another peer. If the resource is allocated to the other peer, the network management server may request the other peer to return the resource, and may delete resource allocation information recorded to correspond to the resource. A resource error procedure is described above and thus, a further detailed description will be omitted here.

According to example embodiments, in response to a request for releasing sharing of the resource from the selected resource entity, the network management server may verify whether the peer uses the resource. If the peer uses the resource, the network management server may request the peer to return the resource. The peer may return the resource and may initiate a post-processing procedure associated with resource return. Depending on cases, the peer may request the network management server to allocate another resource.

The matters described with reference to FIGS. 1 through 5 may be applicable to the example embodiment of FIG. 6 and a further detailed description will be omitted.

Figure 7:
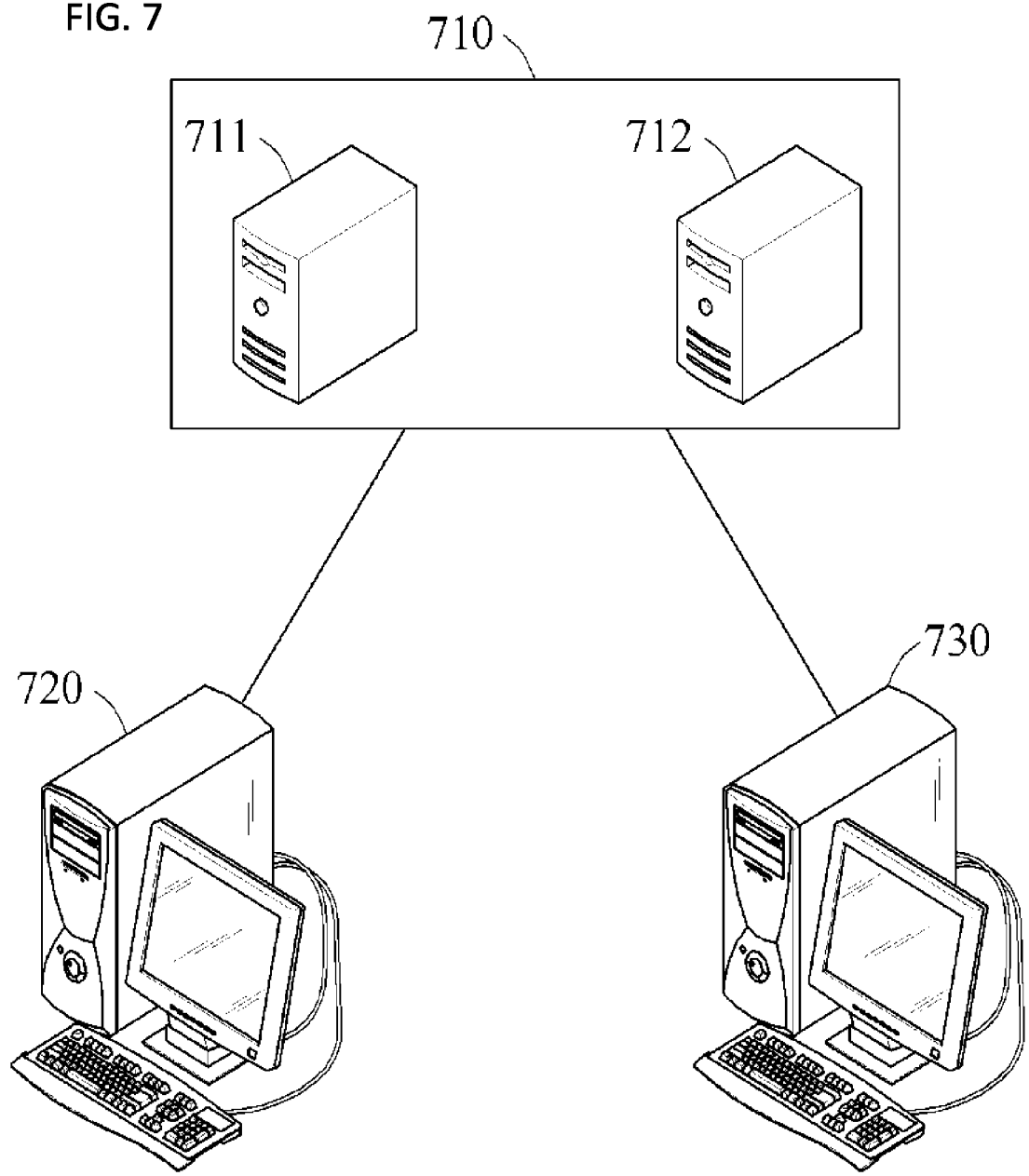
FIG. 7 is a block diagram illustrating a peer-to-peer (P2P) system according to an example embodiment.

FIG. 7 is a block diagram illustrating a P2P system according to an example embodiment.

Referring to FIG. 7, the P2P system includes a server 710 and a plurality of peers 720 and 730. The server 710 may include an OMS 711 and a peer activity management server (PAMS) 712. The OMS 711 may be the aforementioned network management server.

The OMS 711 may manage information about a P2P network and may provide information about the P2P network to the plurality of peers 720 and 730 so that the plurality of peers 720 and 730 may configure the P2P network. Also, the OMS 711 may manage resources of an overlay network which the plurality of peers 720 and 730 joins.

The PAMS 712 may manage information about the plurality of peers 720 and 730. For example, the PAMS 712 may collect and/or manage status information of the plurality of peers 720 and 730. Here, the status information may include static information and dynamic information of a peer. The static information may include information associated with a configuration of the P2P network and a service policy of the P2P network. The dynamic information may include information associated with activities of the plurality of peers 720 and 730. The plurality of peers 720 and 730 may report the dynamic information to the PAMS 712 at each report period. For example, each of the plurality of peers 720 and 730 may report an amount of data received from another peer, an amount of data transmitted to the other peer, a data transmission/reception history, and the like, to the PAMS 712.

The PAMS 712 may analyze status information of the plurality of peers 720 and 730, and may provide an analysis result to the OMS 711.

The OMS 711 may update status information of the overlay network maintained at the OMS 711 to maintain a status of the overlay network to be in a latest status. In detail, the OMS 711 may request the PAMS 712 for status information of the plurality of peers 720 and 730 that joins the overlay network. The PAMS 712 may respond to the request for the status information based on information maintained at the PAMS 712.

The OMS 711 and the PAMS 712 may be physically distinguished from the server 710. Also, the OMS 711 and the PAMS 712 may be logically distinguished within a single physical device.

According to example embodiments, the OMS 711 may select a resource entity corresponding to a resource to be allocated to a peer based on shared resource information. Also, the OMS 711 may transmit resource allocation request information including resource release condition information to the selected resource entity. Also, in response to allocating the resource for the peer based on resource allocation information, the OMS 711 may receive resource allocation result information from the selected resource entity. Also, the OMS 711 may transmit resource allocation result information to the peer.

The matters described above with reference to FIGS. 1 through 6 may be applicable to the example embodiment of FIG. 7 and thus, a further detailed description will be omitted here.

According to example embodiments, the P2P system performs following at least one procedure.

<Registration of CS/RS>

The CS and RS needs to provide information on the resources that CS/RS is willing to share.

As with the initiation, CS/RS checks the resources to be shared. CS/RS sends information of the resources to OMS. The resources can be uplink/downlink bandwidth, number of connection, storage size, etc. The OMS stores the information provided by the CS/RS. OMS checks the validity of the CS/RS during this procedure. In this procedure, OMS can classify the type of CS for providing prioritized communications among CSs based on its history of activity, quality of resources. For example, if the CS is residing in service provider domain that can provide overlay resources with stability and certain level of quality like network bandwidth, it will have higher priority than a CS of user domain. The OMS also allocates identifier of resources for the CS/RS on successful registration. On failure, OMS sends reason for failure.

NOTE 1—RS follows the same procedures to registration of CS/RS. RS uses RSRM FE instead of CSRM FE.

NOTE 2—The identifier of resource must be unique in the MP2P overlay network. The allocation method of identifier of resource is equivalent to the allocation method of identifier of peer, which not defined in this Recommendation.

<Registration Updates of CS/RS>

CS/RS can change the resource capacity anytime if needed.

The resource capacity identifies the amount of resource that the CS/RS is willing to share. The resource capacity includes max_storage_size, max_uplink_bandwidth, max_downlink_bandwidth, max_num_connection, and max_num_overlay_network. The max_storage_size indicates the maximum size of the storage for share. This attribute is used by CS. The max_uplink_bandwidth indicates the maximum uplink bandwidth for share. The max_downlink_bandwidth indicates the maximum downlink bandwidth for share. The max_num_connection indicates the maximum number of connectivity possible for share. The max_num_overlay_network indicates the maximum number of overlay network possible to join by CS/RS.

After updates on the information of resources, CS/RS sends the updated information to the OMS. Since OMS stores the information of the resource, it makes updates to the changed information provided by CS/RS. OMS responds with the update results, which can be a success or failure. On failure, it will send a reason for failure.

<Usages of Overlay Resource>

The overlay resource can be allocated by the request from peer or by OMS when the OMS decides that the MP2P service needs the use of overlay resource. The following cases describe when the overlay resources are allocated and used.

Case 1: Distribution of contents in overlay network are slow and ineffective.

One or more CS can participate in an overlay network in order to increase the distribution rate. Normally, newly created overlay network tends to show low contents distribution rate. In this case, OMS or peer can use one or more CS until distribution rate reaches pre-defined rate, which is set by the service provider. CS can retrieve contents from contents provider and distribute the contents in order to increase contents distribution rate.

The allocation duration of overlay resources and usage can be varied in various situation. It is possible to set conditions for releasing the allocated overlay resource. The OMS/peer needing overlay resource sets release condition during CS/RS reservation. The CS release condition are as follows.

CS participates for requested period;
CS participates until the contents distribution rate reach specified rate;
CS participates until the number of seeds (i.e., peer having entire contents) has reached specified number;
If there is no release condition, CS participates until OMS release the overlay resource.

Case 2: A peer needs to download particular contents, but it is not able to participate in the overlay network.

CS can participate in the overlay network on behalf of the requesting peer to retrieve contents. After CS has retrieved entire contents, it leaves the overlay network and informs the peer of the completion of contents download. CS informs the peer through out-of-band mechanism such as e-mail or messages. Peer can fetch the contents from CS directly, afterwards. Since CS has limited amount of storage, CS maintains the retrieved data for a specified period.

Case 3: A peer needs to distribute contents, but it is not able to participate in the overlay network.

CS can participate in the overlay network on behalf of the requesting peer to distribute contents. Peer can directly send the contents to CS to be distributed in overlay network. Regarding CS release condition, CS participates for requested period or until specified amount of traffic has been delivered. If there is no release condition, CS participates until the OMS releases the overlay resource.

Case 4: A peer is placed behind NAT/Firewall, and it cannot retrieve contents from other peers.

RS is involved in this case, RS can retrieve contents from other peers and directly relay the received contents to requesting peer. Regarding RS release condition, RS participates for requested period or until specified amount of traffic has been delivered. If there is no release condition, CS participates until the OMS releases the overlay resource.

Whatever the case, if the peer or OMS still needs the overlay resource after the release, it can request for a new resource through CS/RS reservation procedure.

<Reservation of Overlay Resources in CS>

Peer or OMS can reserve and use resource of CS.

If the peer needs support from overlay resources, it requests to OMS for the amount of resources needed.

In allocating CS, OMS finds the most appropriate CS that is advantageous to the P2P service. For case 1, it needs to find CS that is relatively distant from seeds. For case 2 and case 3, it selects CS that is relatively closer to the requesting peer. In order to find CS regarding network distance perspective, it obtains assistance from UNIS requesting network score between allocating peer and the list of CS. OMS also needs to check the allocation status of available CS to find CS that is relatively idle in order to fully support the requested service.

OMS requests reservation of resources from selected CS. On requesting overlay resource of CS, it embeds priority information that can be used to identify the type and priority of peer. This information will be different according to its priority level. The CS performs P2P peer join procedure and responds to OMS with allocation status. After successful CS reservation, CS is used in the overlay network.

For case 1, CS acts as an ordinary peer, sending/receiving contents from peer A and peer B. For case 2, peer send/receive contents from other peers. After completion of download, CS delivers contents to peer A. For case 3, CS receives contents from peer A and delivers contents to other peers.

<Reservation of Overlay Resource in RS>

Peer can reserve and use the resources of RS.

Peer placed behind a NAT/Firewall as in case 4 needs support from RS. Peer request for reservation of RS to OMS.

In allocating RS, OMS finds the most appropriate RS that can support peer behind NAT/Firewall. It would be appropriate to select RS that is closer to the requesting peer in network distance perspective. This information can be acquired from UNIS requesting network score between requesting peer and the list of RS. OMS also needs to check the allocation status and of RS to find RS that is relatively idle in order to fully support the requested service.

OMS requests reservation of resources from selected RS. After successful RS reservation, RS is used in the overlay network. The contents that are sent from peer A are delivered directly to peer B. However, contents from peer B are delivered to RS which are forwarded to peer A.

<Updates to Allocation/Reservation on Overlay Resource>

OMS or peer or may want to update the allocated overlay resources.

Peer needing updates to the allocated resource can make change to the reservation using resource ID and virtual peer ID/relay instance ID. OMS requests CS/RS for reservation updates to the overlay resource used in particular overlay network. The CS/RS checks to see if the update can be accepted, if it is possible it makes updates to the overlay resource. CS/RS responds to the update. The OMS updates the CS/RS allocation-related information and responds to peer.

<Release of Allocated Overlay Resource>

OMS or peer may no longer need the support from CS/RS. In this case, it needs to release the allocated resource.

Peer no longer needing the resource of CS/RS can explicitly return the particular resource through using resource ID and virtual peer ID/relay instance ID. OMS requests CS/RS to release the resource used in the overlay network. The CS/RS removes allocated information and responds to OMS of the release result. OMS updates the CS/RS allocation-related information.

<Probing Resource Allocation Status for Single Peer>

The peer sends get resource message to OMS. The OMS sends status resource message with the identifier of overlay resource. The CS/RS sends a response of status OK or error with adequate reason. The OMS forwards the response to the requesting peer.

OMS or managed P2P service administrator can probe for the resource allocation status on a single peer to the CS/RS.

<Recovery from Failure of Overlay Resource>

Peer A send/receives contents to/from CS/RS. Suddenly, CS/RS fails, then peer A is unable to communicate with CS/RS and peer A can detect the failure of CS/RS. The peer ask the OMS to check the CS/RS and remove the CS/RS information from its memory. The OMS checks the status of CS/RS. If there is no response from the CS/RS, OMS remove the CS/RS information. If the service continuously needs support from CS/RS, OMS and peer perform resource reservation process with another CS/RS.

<Deregistration of CS/RS>

CS/RS needs to release the allocated overlay resources before its deregistration.

CS/RS sends a message to OMS to notify of its deregistration. OMS removes any information related to deregistering CS/RS and responds to the request.

The CS/RS can be currently in use by any peer. However, the peer can detect the problem of CS/RS through procedure in <Recovery from failure of overlay resource>. Upon detection of absence of CS/RS in use, peer releases the overlay resource and performs overlay resource reservation procedure in <Reservation of overlay resources in CS> and/or <Reservation of Overlay Resource in RS>.

In a general P2P network, at least one peer may distribute content. Also, a peer having received the distributed content may distribute the content to another peer. At an initial stage of the P2P network, a relatively small number of peers maintain contents and thus, content distribution may be slowly performed. As time passes, a large number of peers may maintain contents. A plurality of peers may perform the content distribution at the same time and thus, the content distribution may be quickly performed.

When a CS, for example, a content server or a cache server, receives content from a content distribution peer, and distributes the content together with the content distribution peer, the P2P network may reach a stable status further quickly.

In a situation in which a peer may not distribute content due to an unstable network connection status, the peer may copy the content for the CS and the CS may distribute the content instead of the peer. Also, in a situation in which the peer may not receive the content, the CS may receive the content instead of the peer and may transfer the content to the peer when a network connection status of the peer is stable.

If the peer is at rear of NAT/Firewall, an RS, for example, a relay server or a retransmission server, having an official IP address may relay content transmission and reception of the peer. Here, the RS may not store content, which differs from the CS.

According to example embodiment, it is possible to control and manage a CS/RS, and to allocate the CS/RS to a peer.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The apparatuses described herein may be implemented using hardware components, software components, and/or combination of the hardware components and the software components. For example, the apparatuses and the components may be configured using at least one universal computer or special purpose computer, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A resource management method of a network management server, the method comprising:
selecting a resource entity, the resource entity being a cache server or a relay server;
transmitting, to the selected resource entity, a resource allocation request to reserve a resource of the selected resource entity;
receiving a response of the request from the selected resource entity, in response to the resource being allocated to a peer by the selected resource entity;
receiving, from the peer, a request to check the selected resource entity in response to a failure of the selected resource entity being detected by the peer;
checking a status of the selected resource entity; and
removing allocation information of the selected resource entity if there is no response from the selected resource entity
wherein the resource allocation request includes leave condition information, and
wherein the leave condition information includes
a first condition indicating a predetermined timeout time of resource usage,
a second condition indicating network traffic volume processed by the cache server or the relay server exceeds a predetermined maximum traffic,
a third condition indicating the number of seeders joining a peer-to-peer (P2P) network exceeds a predetermined number of seeders, and
a fourth condition indicating a return of the resource after a requested task is completed.

2. The method of claim 1, further comprising:
receiving a shared resource information from the resource entity; and
allocating resource identification information to the resource entity based on the shared resource information.

3. The method of claim 2, wherein the shared resource information includes at least one of information about a resource capacity of the resource entity and resource share time information.

4. The method of claim 1, further comprising:
requesting the selected resource entity to release the resource, in response to a request from the peer for returning the resource; and
receiving resource release result information from the selected resource entity.

5. The method of claim 4, further comprising:
deleting resource allocation information recorded to correspond to the resource, in response to receiving the resource release result information.

6. The method of claim 1, further comprising:
verifying whether another peer allocated with the resource is present, in response to absence of a response from the selected resource entity; and
requesting the other peer to return the resource, and deleting resource allocation information recorded to correspond to the resource, in response to presence of the other peer.

7. The method of claim 1, further comprising:
verifying whether the peer uses the resource of the selected resource entity, in response to a resource share release request of the selected resource entity; and
requesting the peer to return the resource in response to the peer using the resource.

8. A server comprising:
a memory configured to store computer readable instructions; and
a processor configured to execute the computer readable instructions such that the processor is configured to, select a resource entity, the resource entity being a cache server or a relay server, transmit, to the selected resource entity, a resource allocation request to reserve a resource of the selected resource entity, receive a response of the request from the selected resource entity in response to the resource being allocated to a peer by the selected resource entity, receive, from the peer, a request to check the selected resource entity in response to a failure of the selected resource entity being detected by the peer, check a status of the selected resource entity, and remove allocation information of the selected resource entity if there is no response from the selected resource entity, wherein the resource allocation request includes leave condition information, and wherein the leave condition information includes a first condition indicating a predetermined timeout time of resource usage, a second condition indicating network traffic volume processed by the cache server or the relay server exceeds a predetermined maximum traffic, a third condition indicating the number of seeders joining a peer-to-peer (P2P) network exceeds a predetermined number of seeders, and a fourth condition indicating a return of the resource after a requested task is completed.

9. The server of claim 8, wherein the processor is further configured to:

receive a shared resource information from the resource entity, and allocate resource identification information to the resource entity based on the shared resource information.

10. The server of claim 9, wherein the shared resource information includes at least one of information about a resource capacity of the resource entity and resource share time information.

11. The server of claim 8, wherein the processor is further configured to:

request the selected resource entity to release the resource, in response to a request from the peer for returning the resource, and receive resource release result information from the selected resource entity.

12. The server of claim 11, wherein the processor is further configured to delete resource allocation information recorded to correspond to the resource, in response to receiving the resource release result information.

13. The server of claim 8, wherein the processor is further configured to:

verify whether another peer allocated with the resource is present, in response to absence of a response from the selected resource entity, and request the other peer to return the resource, and deleting resource allocation information recorded to correspond to the resource, in response to presence of the other peer.

14. The server of claim 8, wherein the processor is further configured to:

verify whether the peer uses the resource of the selected resource entity, in response to a resource share release request of the selected resource entity, and request the peer to return the resource in response to the peer using the resource.

* * * * *